(12) United States Patent
Côté

(10) Patent No.: US 8,342,127 B2
(45) Date of Patent: Jan. 1, 2013

(54) SQUIRREL RESISTANT HOPPER TYPE BIRD FEEDER

(76) Inventor: Paul Côté, Lac Brome (CA)

( * ) Notice: Subject to any disclaimer, the term of this patent is extended or adjusted under 35 U.S.C. 154(b) by 247 days.

(21) Appl. No.: 12/807,527

(22) Filed: Sep. 7, 2010

(65) Prior Publication Data

US 2012/0055410 A1    Mar. 8, 2012

(51) Int. Cl.
*A01K 61/02* (2006.01)
(52) U.S. Cl. ...................... 119/52.3; 119/57.9
(58) Field of Classification Search ........... 119/52.2, 119/52.3, 57.8, 57.9
See application file for complete search history.

(56) References Cited

U.S. PATENT DOCUMENTS

| | | | | |
|---|---|---|---|---|
| 4,867,104 A * | 9/1989 | Vandiver | | 119/57.9 |
| 5,048,461 A * | 9/1991 | Wessner | | 119/52.3 |
| 5,078,098 A * | 1/1992 | Ragen | | 119/52.2 |
| 5,309,867 A * | 5/1994 | Cruz | | 119/52.3 |
| 5,471,951 A * | 12/1995 | Collins | | 119/57.9 |
| 5,829,382 A * | 11/1998 | Garrison | | 119/52.2 |
| 5,921,201 A * | 7/1999 | Green | | 119/52.3 |
| 5,927,231 A * | 7/1999 | Bloedorn | | 119/52.2 |
| 6,065,427 A * | 5/2000 | Peinetti | | 119/57.9 |
| 6,095,087 A * | 8/2000 | Bloedorn | | 119/52.2 |
| 6,701,867 B1 * | 3/2004 | Garrison | | 119/57.8 |
| 7,347,162 B2 * | 3/2008 | Zieff et al. | | 119/52.3 |
| 2008/0029035 A1 * | 2/2008 | Gou | | 119/52.2 |

* cited by examiner

*Primary Examiner* — Monica Williams
(74) *Attorney, Agent, or Firm* — Eric Fincham (57) ABSTRACT

A hopper type squirrel resistant bird feeder which has a base having first and second ends and first and second sides, first and second end walls located proximate the first and second ends of the base and first and second side walls set inwardly of the first and second sides of the base to define a feed access area with the first and second side walls being spaced upwardly from the base, a feed cavity being defined by the base, end walls and side walls, and a seed guard extending over the feed access area, the seed guard having at least a portion spaced from the base and having apertures formed therein to permit access by birds to the feed access area. The bird feeder is of the knock down variety and can easily be disassembled for cleaning purposes.

14 Claims, 16 Drawing Sheets

SQUIRREL RESISTANT HOPPER TYPE BIRD FEEDER

FIELD OF THE INVENTION

The present invention relates to a bird feeder and more particularly, to a hopper type bird feeder.

BACKGROUND OF THE INVENTION

Birding is one of the most popular past times in the world. The participants range from professional observers to hobbyists who will spend a day or more looking for different types of birds in the wild. Many bird enthusiasts will also feed birds at home hoping to attract certain types of birds. As a result, there are many bird feeders which are commercially available.

One problem which occurs when feeding birds is to find a way to prevent the presence of undesired animals and in particular, squirrels. Many different proposals exist in the art for squirrel resistant bird feeders and many different approaches have been taken. These approaches range from the use of baffles on a pole to a greased pole to prevent the squirrel climbing to the feeder. Other approaches have consisted of conceding that the squirrel will get to the bird feeder, but to design the feeder to be squirrel resistant such that the squirrels cannot access the feed contained therein and will eventually become discouraged. The mechanisms used for the feeder have ranged from bird feeders which will spin to throw the squirrel off the feeder to those utilizing shrouds which extend about a feed tube and which shroud will selectively permit or not permit access to the food. Typically, the shroud will move depending upon the weight placed thereon.

One of the simpler and more popular type of bird feeders are what is called a hopper type feeder. Generally, such feeders consist of a base, a pair of end walls, a pair of side walls which are spaced inwardly and upwardly from the base and a cover. To use, the cover is removed and seed is placed within a seed cavity defined by the side and end walls, the seed being permitted to go under the side walls such that access may be had, to the feed by the birds. However, this easy access also permits the squirrels to access the feed.

Typically, hopper-type bird feeders are formed of a wood material with plastic being used for specific portions thereof such as transparent walls which define a portion of the hopper. Typically, the transparent walls are angled inwardly and are spaced from the base of the feeder. They are thus easily accessible to squirrels and other marauders who will chew the walls to gain freer access to the feed.

SUMMARY OF THE INVENTION

It is therefore an object of the present invention to provide a hopper type bird feeder which includes squirrel resistant features.

It is also an object of the present invention to provide a knockdown hopper type bird feeder which may easily be disassembled for purposes of cleaning and the like.

According to one aspect of the present invention there is provided a hopper type bird feeder comprising a base having first and second ends and first and second sides, first and second end walls located proximate said first and second ends of said base, first and second side walls set inwardly of said first and second sides of said base to thereby define a feed access area between said first and second sides and said first and second side walls, said first and second side walls having at least a portion thereof spaced upwardly from said base, a feed cavity defined by said base and said first and second end walls and said first and second side walls, and a seed guard extending over the feed access area, the seed guard having at least a portion thereof spaced from the base, the seed guard having apertures formed therein.

Although the bird feeder can be made of any desired material, it is preferable that it be formed of a plastic material and in particular, a plastic material which is resistant to chewing by marauders. The bird feeder is preferably easily assembled and disassembled for cleaning purposes. Thus, the bird feeder, once disassembled, may be placed in a dishwasher for cleaning. This is highly desirable since many bird feeders which are typically made of wood, are known to harbour infectious matter which can be disastrous for a bird population.

For ease of description, the bird feeder of the present invention is described as being of a generally rectangular configuration. However, it will be understood that any desired configuration may be utilized and the walls and base need not be straight or planar if so desired. Thus, where the term sides, end walls, side walls, base and cover are utilized, they may be of any form or configuration desired and each of the ends, sides or walls may in reality be a segment of a substantially continuous wall.

As aforementioned the bird feeder of the present invention is easily disassembled for cleaning purposes. In order to provide the desired rigidity to the overall structure, various locking devices may be employed to hold the components in place.

The hopper feeder of the present invention is designed so that it may be assembled and disassembled by hand without the necessity of tools or fasteners being required. This permits the feeder to be packaged in a flat knockdown state and later assembled by the end user to form its final assembled configuration which is substantially larger. The smaller dimension of a dismantled feeder packaged in a flat state reduces the amount of space required to store the feeder and to ship the feeder. This will naturally reduce the cost of warehousing and transportation of the feeder.

Maintaining a clean bird feeder is important to prevent the transmission of infection between wild birds and possibly other animals. Feeders can easily be contaminated with bird droppings. Also, the feed itself can become rancid after prolonged exposure to the elements. Thus, the bird feeders should be thoroughly cleaned on a regular basis. This has become recognized by birding enthusiasts who now understand the need for the thorough cleaning and decontamination of bird feeders. The present bird feeder allows thorough cleaning thereof because it can be easily dismantled and then reassembled by hand without the use of tools and/or special fasteners.

Ideally, all surfaces of individual parts are entirely exposed when the feeder is dismantled and thus can be completely cleaned. The feeder of the present invention is preferably made of dishwasher-safe materials and can be placed in a dishwasher for the cleaning step as well as the sanitizing step. The hopper feeder of the present invention is also preferably resistant to squirrels or other marauders gaining access to the feed. It is designed to selectively permit birds to access food with their longer slim beaks through narrow fluted openings in a seed guard. Squirrels, because of their larger and wider facial geometry, will not be permitted to access the bird seed through the relatively narrow fluted openings in a seed guard. The fluted shapes of the openings in the seed guard may be designed to be of a length and dimension so as to create enough distance between the food and guard to prevent a squirrel from accessing seed with their paws or their teeth and tongue. The use of different configurations for the openings in the seed guards permits one to control which birds may access the feed. Thus, one can control the distance between the seed guard and the seeds and one can also control the sizing of the aperture. This permits one to attract certain types of birds having beaks which can reach the food. Still further, the configuration of the perch can also be utilized in conjunction with the openings in the seed guard. The distance between the seed and the perch varies and one could size the openings in the seed guard according to the distance from the perch.

As aforementioned, the present invention discloses a hopper-type bird feeder which can be assembled and disassembled by hand without the use of tools. An interlocking system allows the creation of a hopper structure that is as rigid as a conventional hopper feeder which uses more traditional fasteners for assembly and cannot be easily dismantled.

In one embodiment of the present invention, each of the end walls have formed on the bottom thereof, capped posts, which slide into key-hole openings in the base section. The key-hole openings are preferably located so that the large portion of the key-hole opening is towards the inner part of the bird feeder and the smaller part of the key-hole opening is located towards the exterior of the base. When the capped posts are inserted into the large section of the key-hole, they are pushed outwardly and are stopped by the outer limit of the key-hole and the capped section of the post. Thus, the arrangement will prevent any upward movement while outward movement is also controlled by this arrangement. Naturally, the system can be reversed by placing the capped post on the base and the key-hole openings on a bottom wall of each of the end walls. Furthermore, other geometric shapes can produce the same effect and be utilized as appropriate.

In a preferred arrangement, one of the end walls is locked in position as described above. A second end wall will then have an upper horizontal locking member inserted in an upper portion thereof and placed in position with the upper horizontal reinforcing member extending between upper portions of the two end walls. The second end wall is then locked into position.

The upper reinforcing member is preferably arranged so that it can be rotated into an increasingly tapered section of the end walls thus tightening their position until it is locked and placed against the upper end walls. Once in place, the upper horizontal reinforcing member prevents the top end of the end walls from travelling inwardly or outwardly. Subsequently, the side walls are placed in position. In one preferred embodiment, the side walls are engageable in slots formed on the interior facing surface of the end walls. The side walls are preferably transparent in nature and the arrangement is such that a squirrel or other marauder cannot have access to any exposed edge thereof.

BRIEF DESCRIPTION OF THE DRAWINGS

Having thus generally described the invention, reference will be made to the accompanying drawings illustrating an embodiment thereof, in which.

DETAILED DESCRIPTION OF THE INVENTION

Referring to the drawings in greater detail and by reference characters thereto, there is illustrated a bird feeder generally designated by reference numeral 8 and which is comprised of a base generally designated by reference numeral 10, first and second end walls 12, 14, side walls 16, 18 and an upper reinforcing member generally designated by reference numeral 20. The bird feeder further includes a seed guard generally designated by reference numeral 22 and a cover generally designated by reference numeral 24.

Base 10 has a central area with a raised ridge 28 and with first and second sloping walls 30 and 32 extending downwardly and outwardly therefrom. Sloping walls 30, 32 and the outer portion of the base have drainage apertures 34.

A pair of perches 36, 38 are formed integrally with base 10 and are connected to the central portion by means of ribs 40, 42.

As the bird feeder 8 is symmetrically about both a longitudinal and a traverse axis, at times only one portion will be described in detail with it being understood that the other side or end is a reverse mirror image thereof.

Perch 36 includes a perch top wall 44 and side walls 46. The arrangement is such that perch top wall 44 extends beyond the side walls to provide a gripping portion for the bird whereby the claws can extend under perch top wall 44. The portion is also textured to roughen the surface somewhat.

Base 10 also includes a post receptacle generally designated by reference numeral 48 and which post receptacle 48 includes an inner post 50 formed within post receptacle 48 such that it may receive two different size posts as required. Base 10 also includes raised sides 52 along the periphery of the central portion. Located at the four corners are key holes 53 for reasons which will be apparent hereinbelow.

Seed guard 22 has a centre structure 62 from which there extend a pair of sloping walls 54. Each of sloping walls 54 includes a plurality of apertures 56 therein. A pair of ribs 58 extend between sloping walls 54. Located centrally of seed guard 22 are a pair of sloping end walls 60 designed to guide the seed towards the centre of the tray. Centre structure 62 includes an aperture 64 which is arranged such that seed guard 22 may be placed on the protrusion formed by post receptacle 48. Apertures 56 are shown as being of differing sizes and structure. This is merely to indicate some of the possible arrangements so as to vary the distance between the seed and access thereto. Normally, only one particular size of aperture would be used in a given seed guard depending upon the type of birds one wished to attract.

End wall 12 will now be described in greater detail, again with the understanding that end wall 14 is a mirror image thereof. End wall 12 has a central planar portion 68 with a plurality of ribs 70 for structural strength. End wall 12 includes a top wall 72, a pair of side walls 74, 76 and a bottom wall 78. There are provided a plurality of vertically extending elements 80 which define a slot 82. A similar structure is provided on the other side of the end wall 14. Extending outwardly from bottom wall 78 are a pair of locking elements 84 which are designed to it within key-holes 53 of base 10.

It will also be noted that there is a generally elliptically shaped aperture 86 provided in the central planar portion 68 at an upper end thereof. There are also provided a pair of recesses 88 for reasons which will be discussed hereinbelow.

Figure 10:
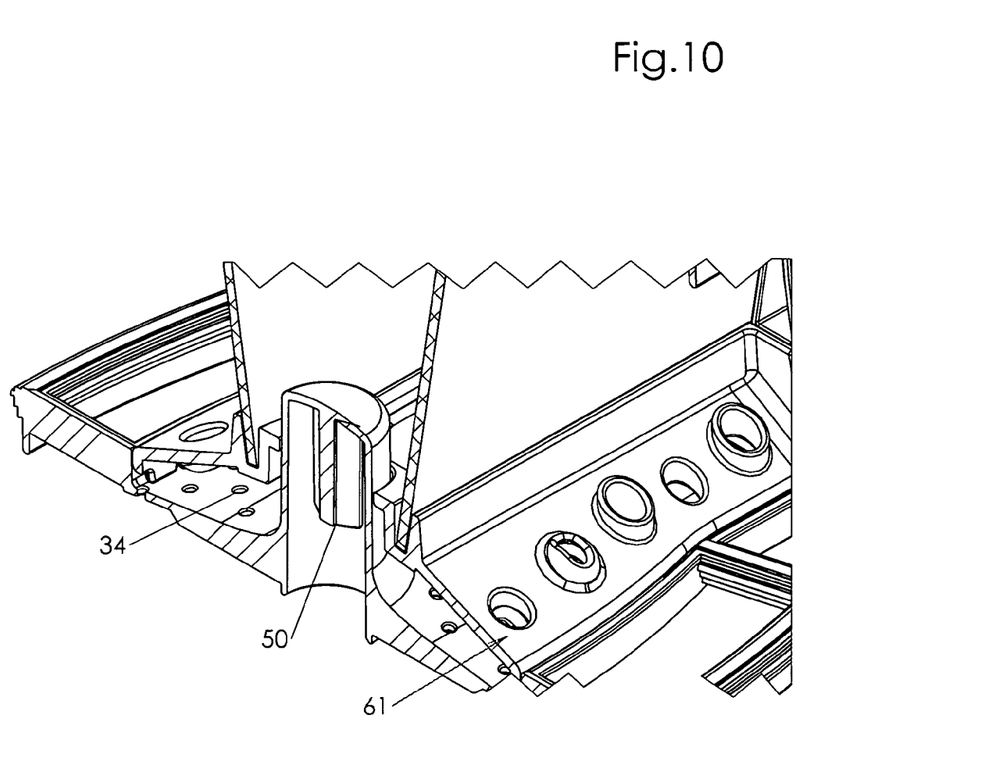
FIG. 10 is a cross-sectional view of the bottom portion of the bird feeder.
Figure 11:
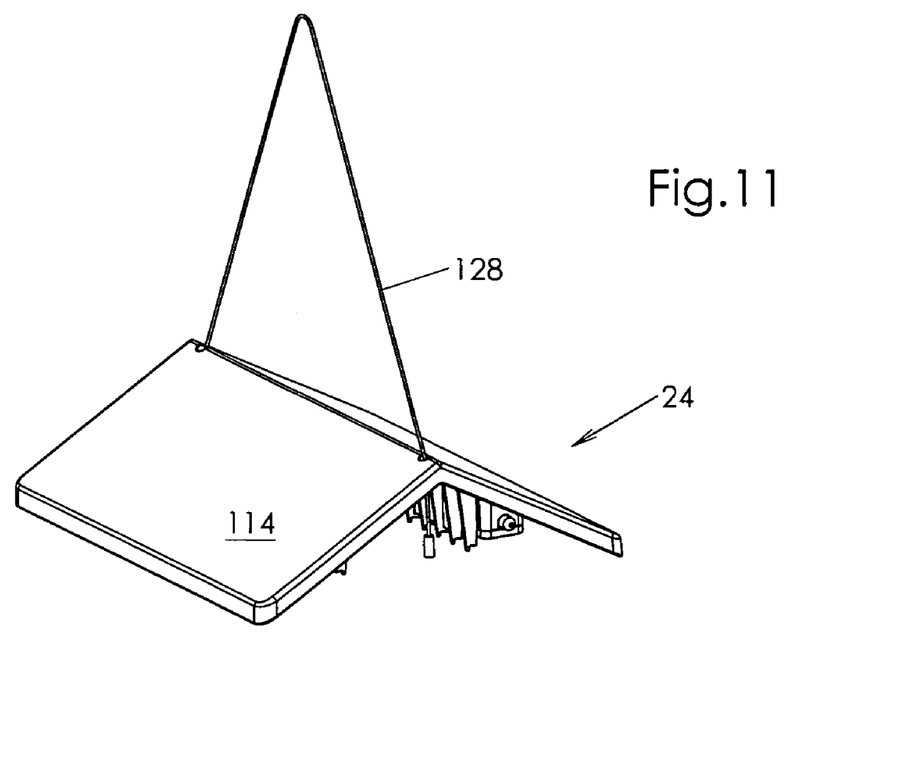
FIG. 11 is a perspective view illustrating the roof about to be attached to the bird feeder.
Figure 12:
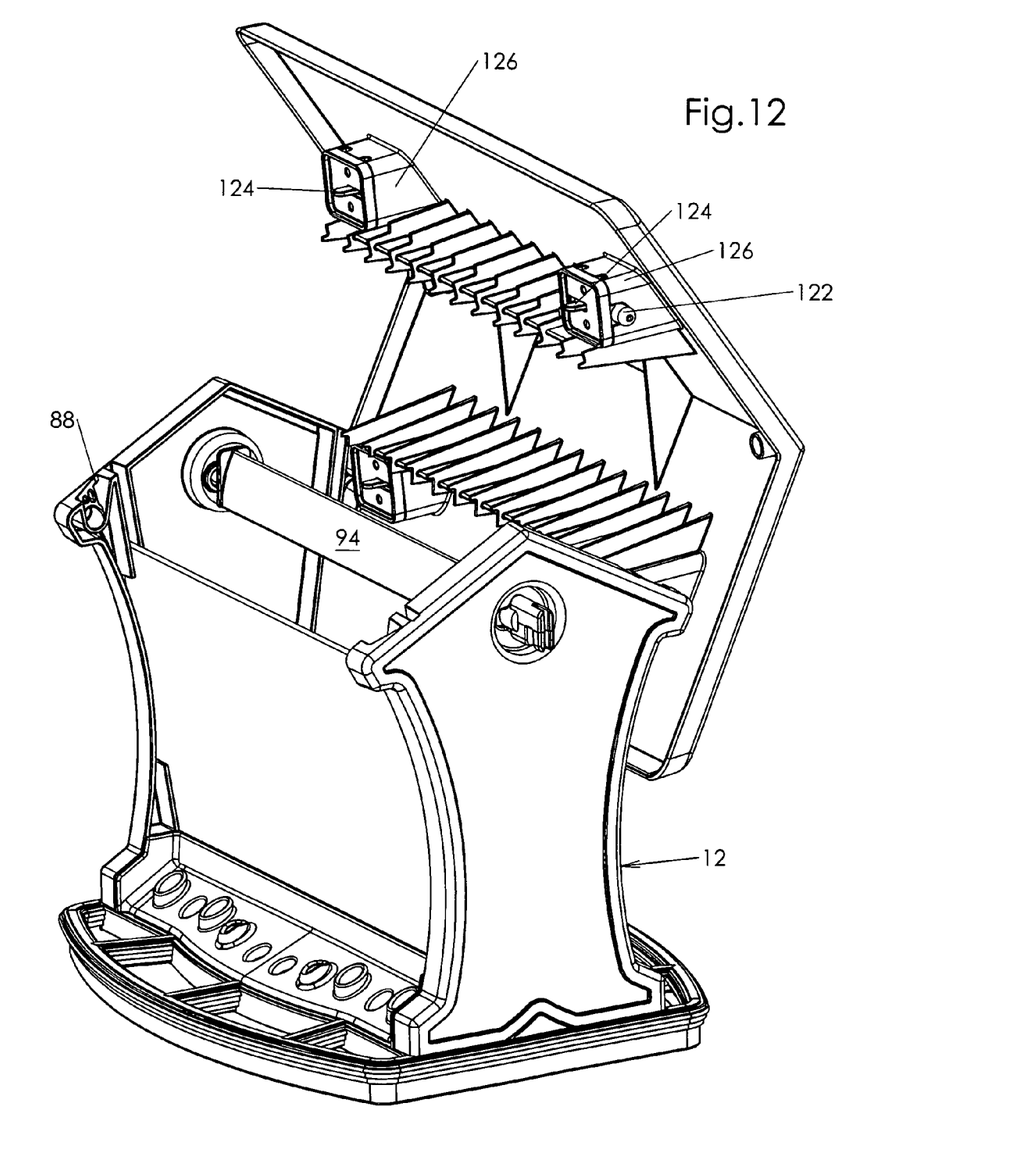
FIG. 12 is a perspective view illustrating the rotational movement of the roof to gain access to the feed cavity.
Figure 13:
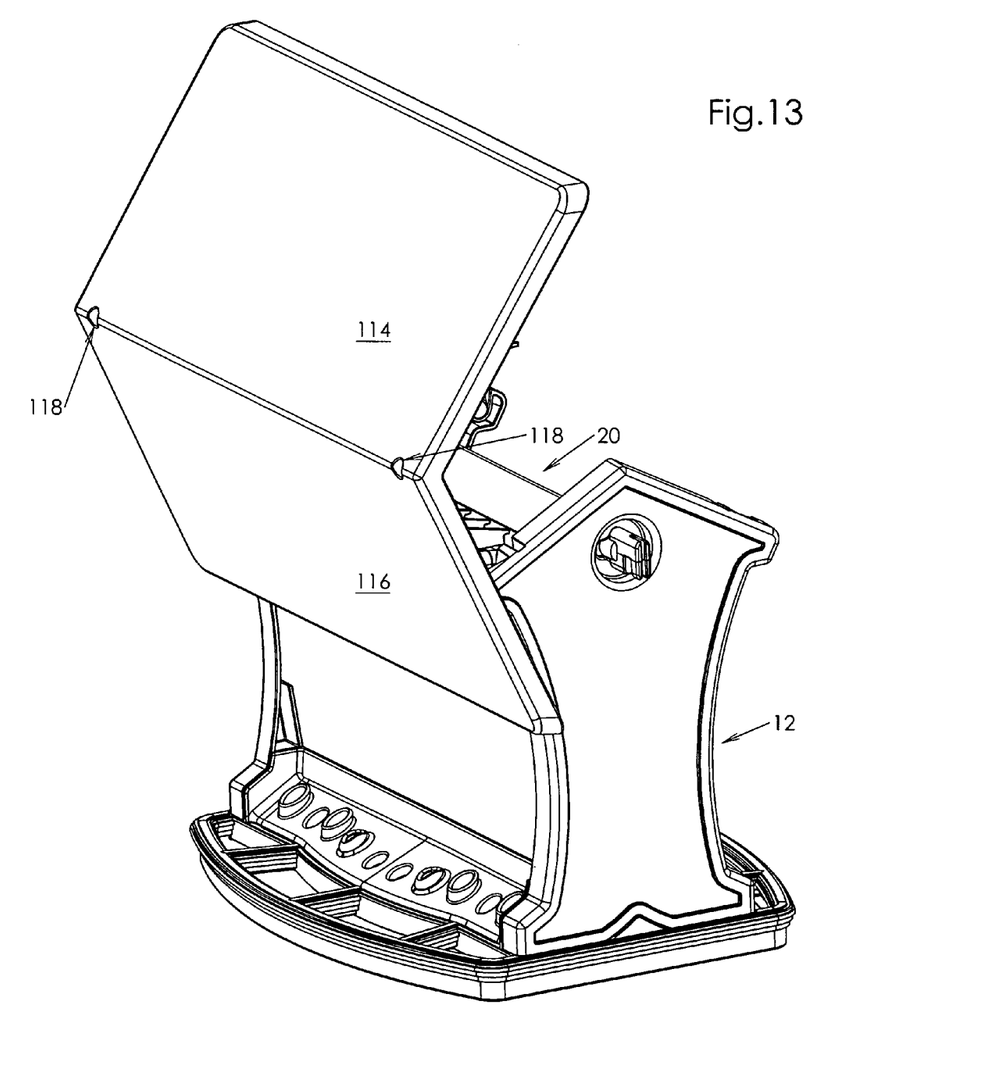
FIG. 13 is a perspective view from the opposite side thereof.
Figure 14:
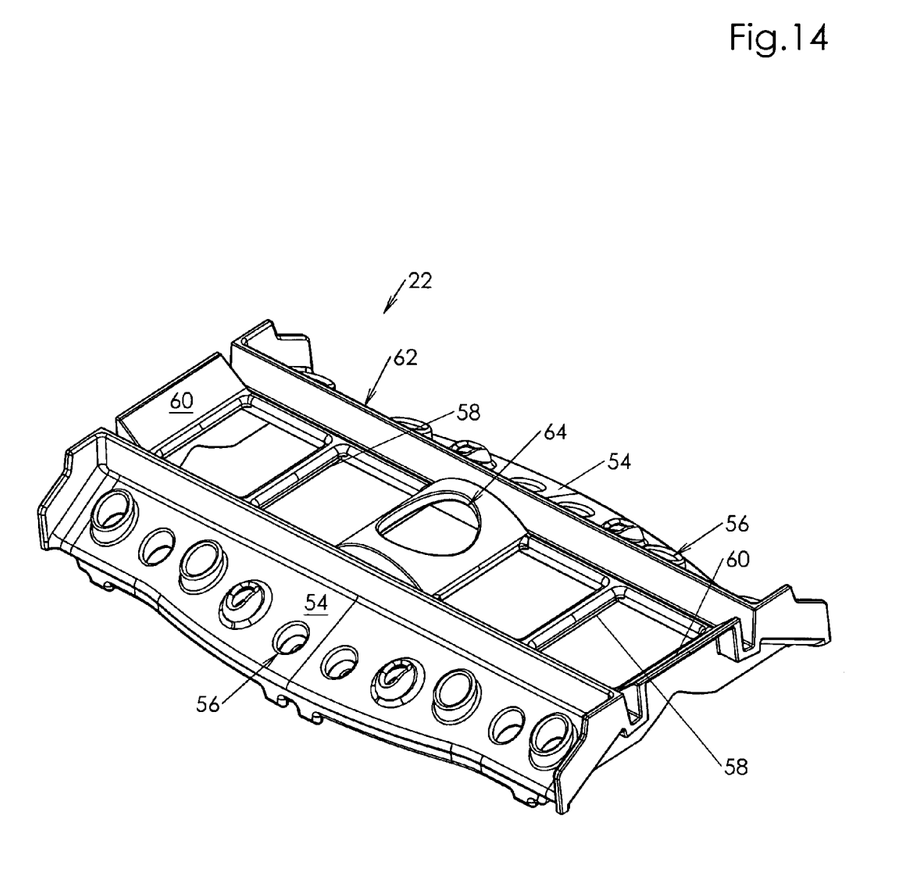
FIG. 14 is a top perspective view of the seed guard.
Figure 15:
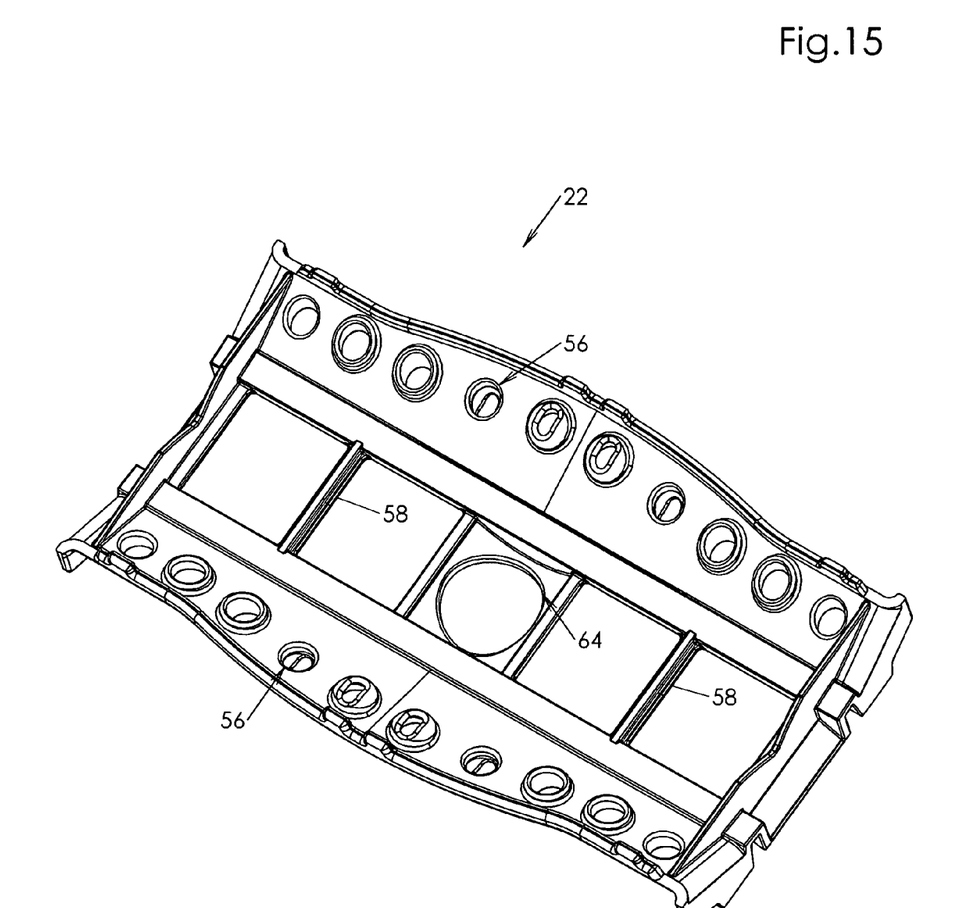
FIG. 15 is a bottom perspective view thereof.
Figure 16:
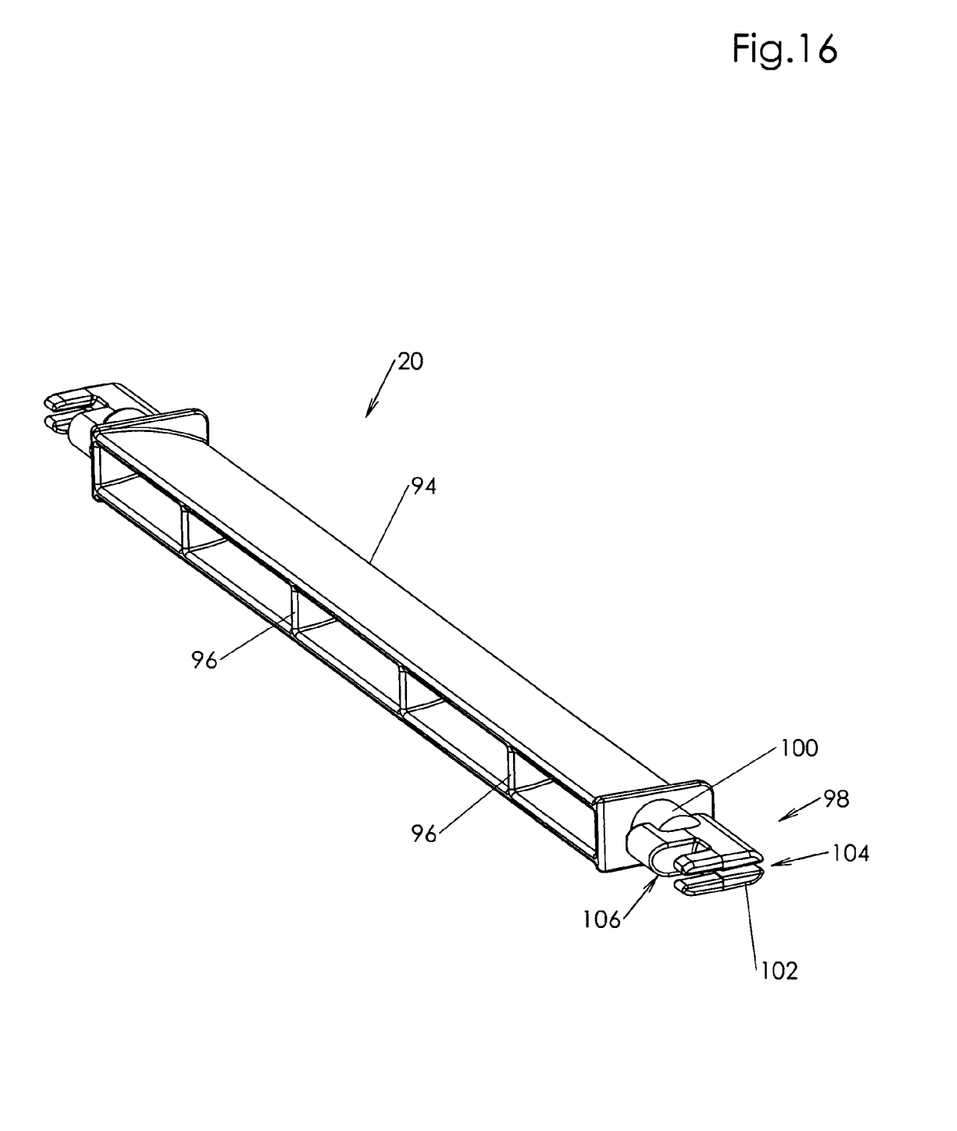
FIG. 16 is a perspective view of the upper reinforcing member.

Slots 82 are designed to receive one end of side wall 16, 18. As seen in FIG. 10, it will be noted that side walls 16, 18 extend within a channel of seed guard 22. This will prevent any marauders such as squirrels from chewing on the lower marginal edge of side walls 16, 18. The sides are also protected by end walls 12, 14.

Upper reinforcing member 20 provides a central triangular portion 94 having internal ribs 96 formed therein. Located at each end is an end structure 98 which includes a cylindrical portion 100 and end member 102. A slot 104 is provided within end member 102 as well as a recess 106.

Figure 1:
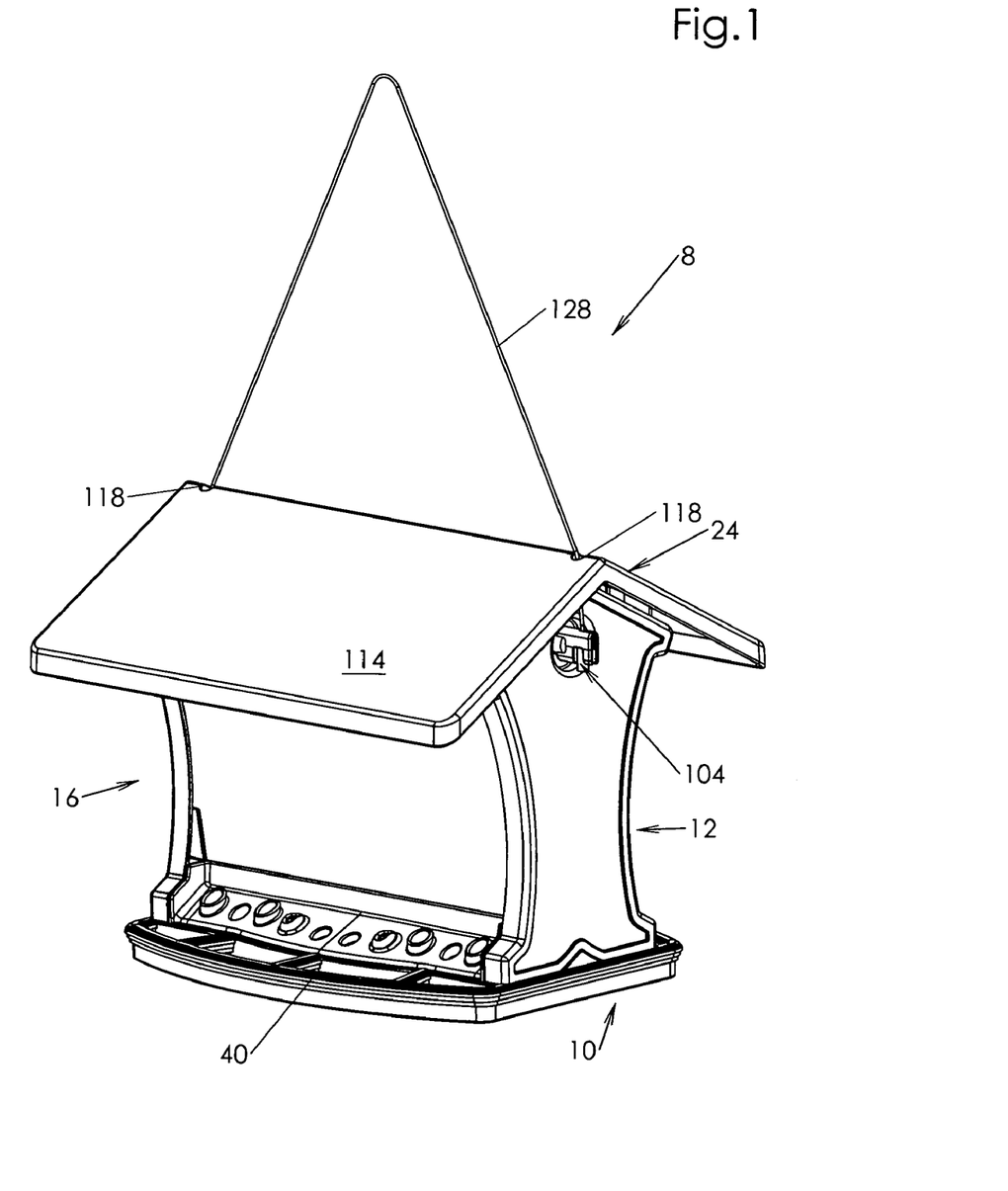
FIG. 1 is a perspective view of the squirrel resistant hopper type bird feeder of the present invention.
Figure 2:
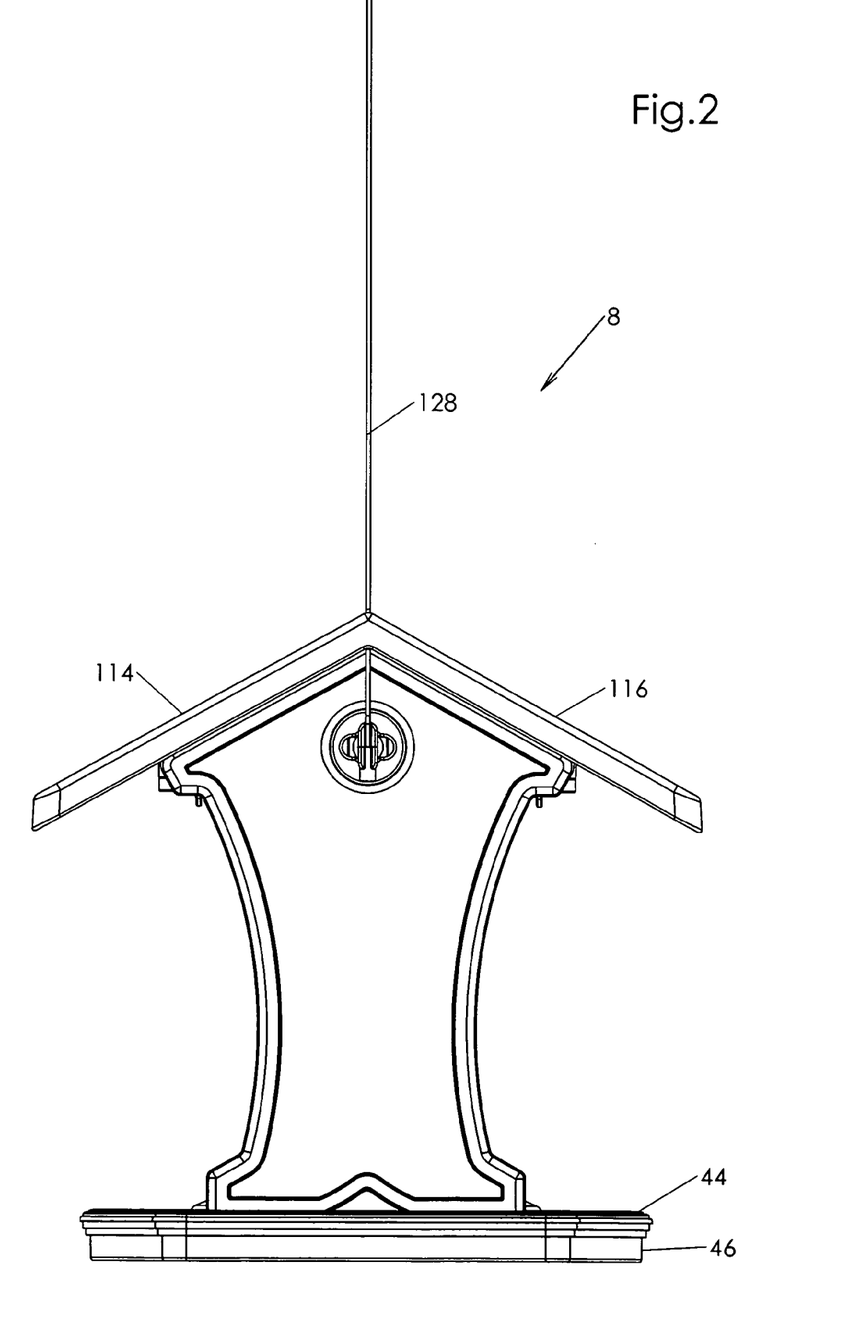
FIG. 2 is an end elevational view thereof.
Figure 3:
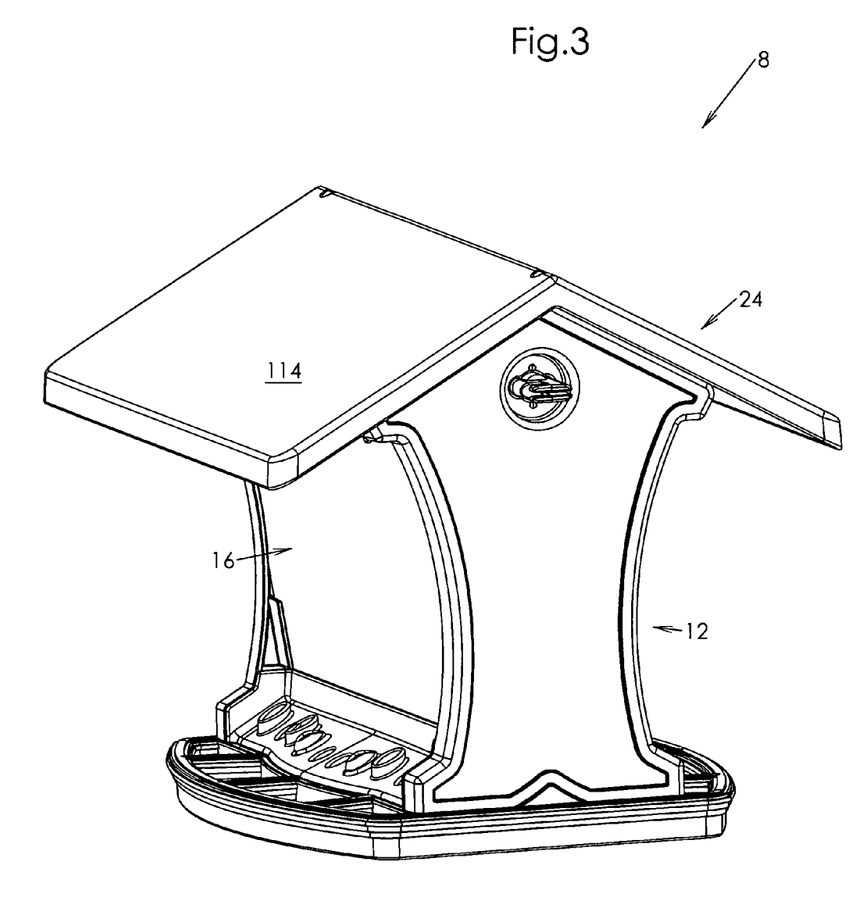
FIG. 3 is a perspective view of the bird feeder prior to tightening of the reinforcing member and without the hanging cord.
Figure 4:
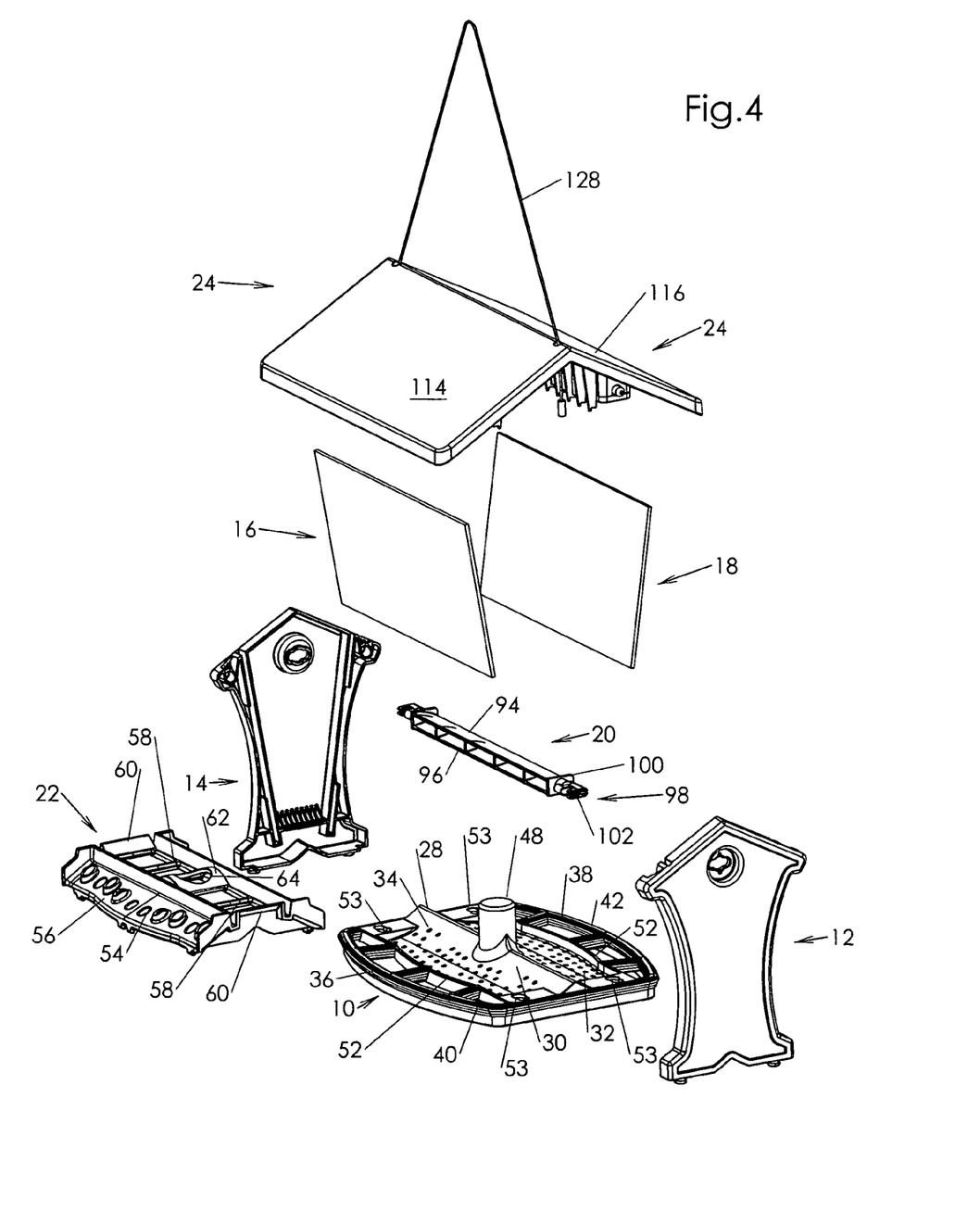
FIG. 4 is an exploded view thereof.
Figure 5:
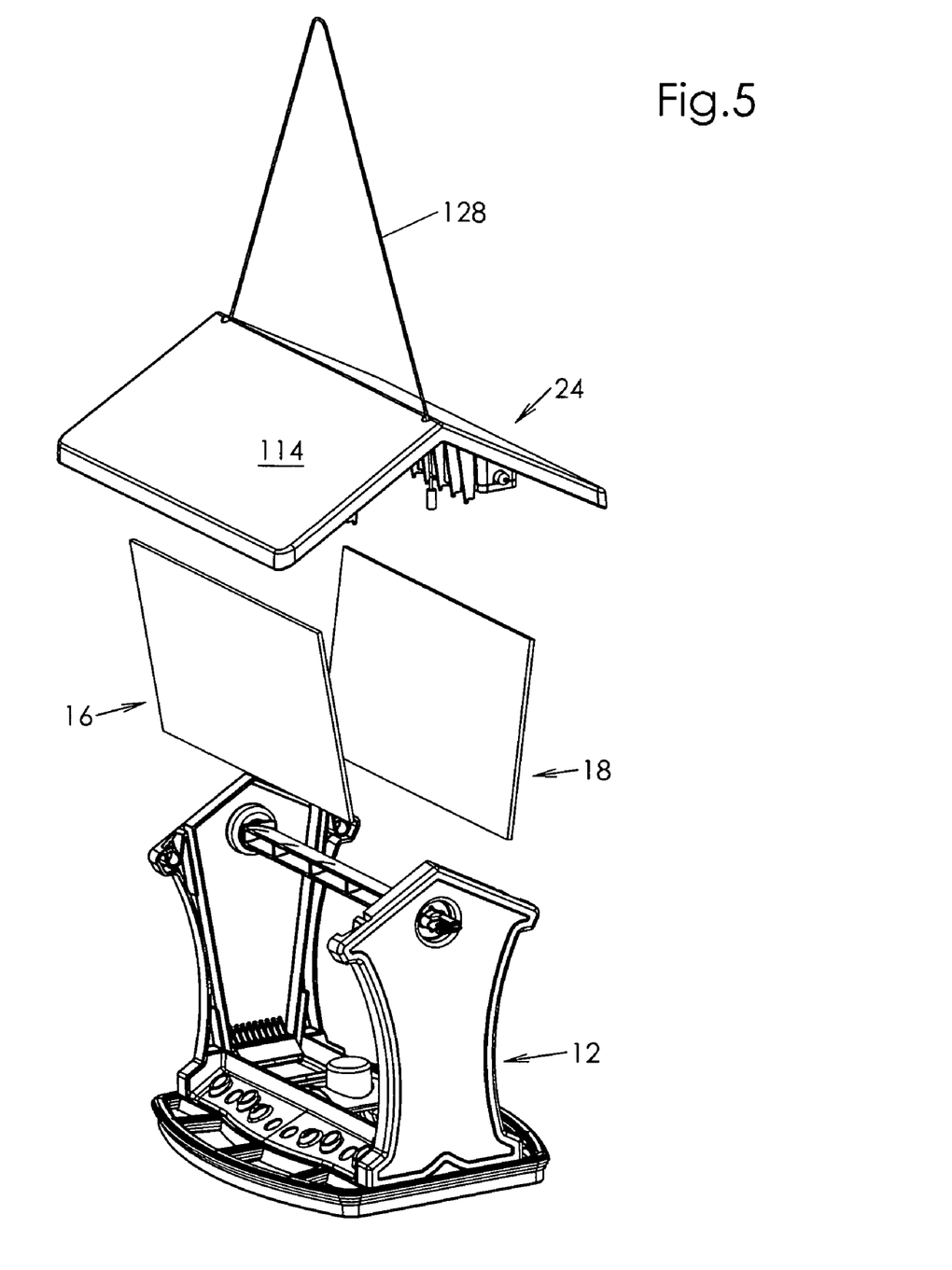
FIG. 5 is a partial exploded view with the seed guard and end walls being secured to the base.
Figure 6:
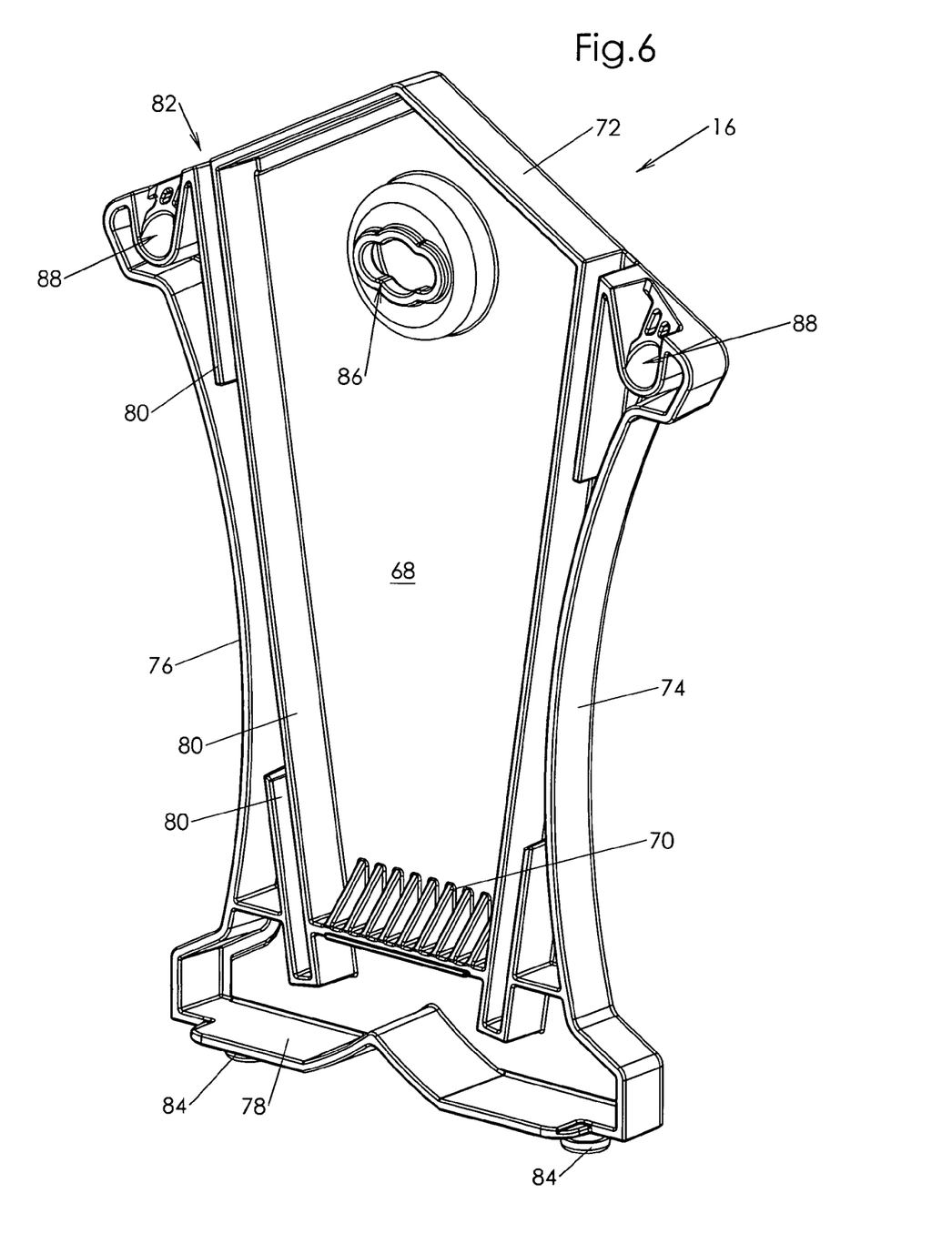
FIG. 6 is a perspective view of an end wall.
Figure 7:
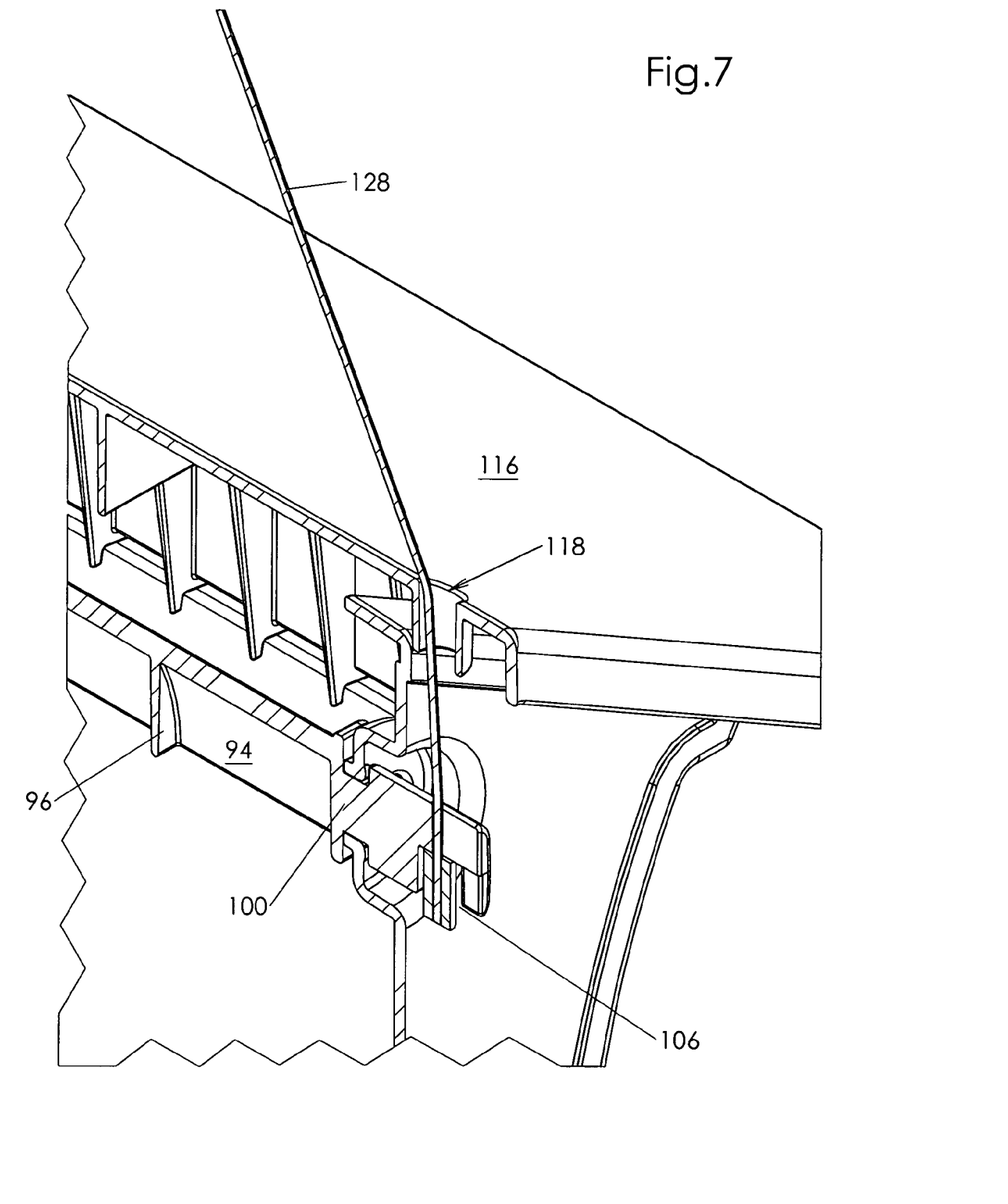
FIG. 7 is a detailed view illustrating the end of the upper reinforcing member when in an reinforcing position and the arrangement of the hanging cord.
Figure 8:
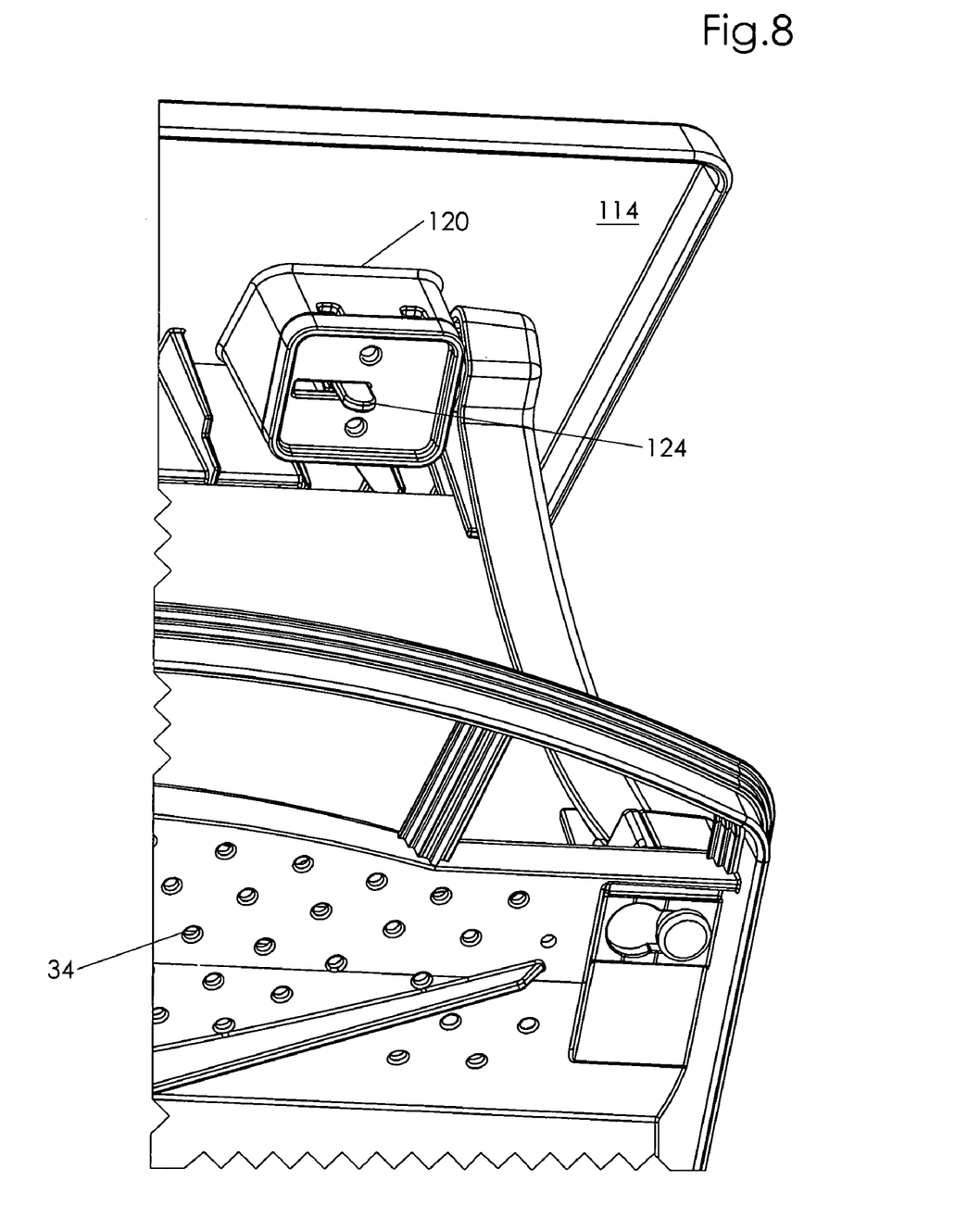
FIG. 8 is a partial view illustrating the locking of the end wall to the base and the cover to the end wall.
Figure 9:
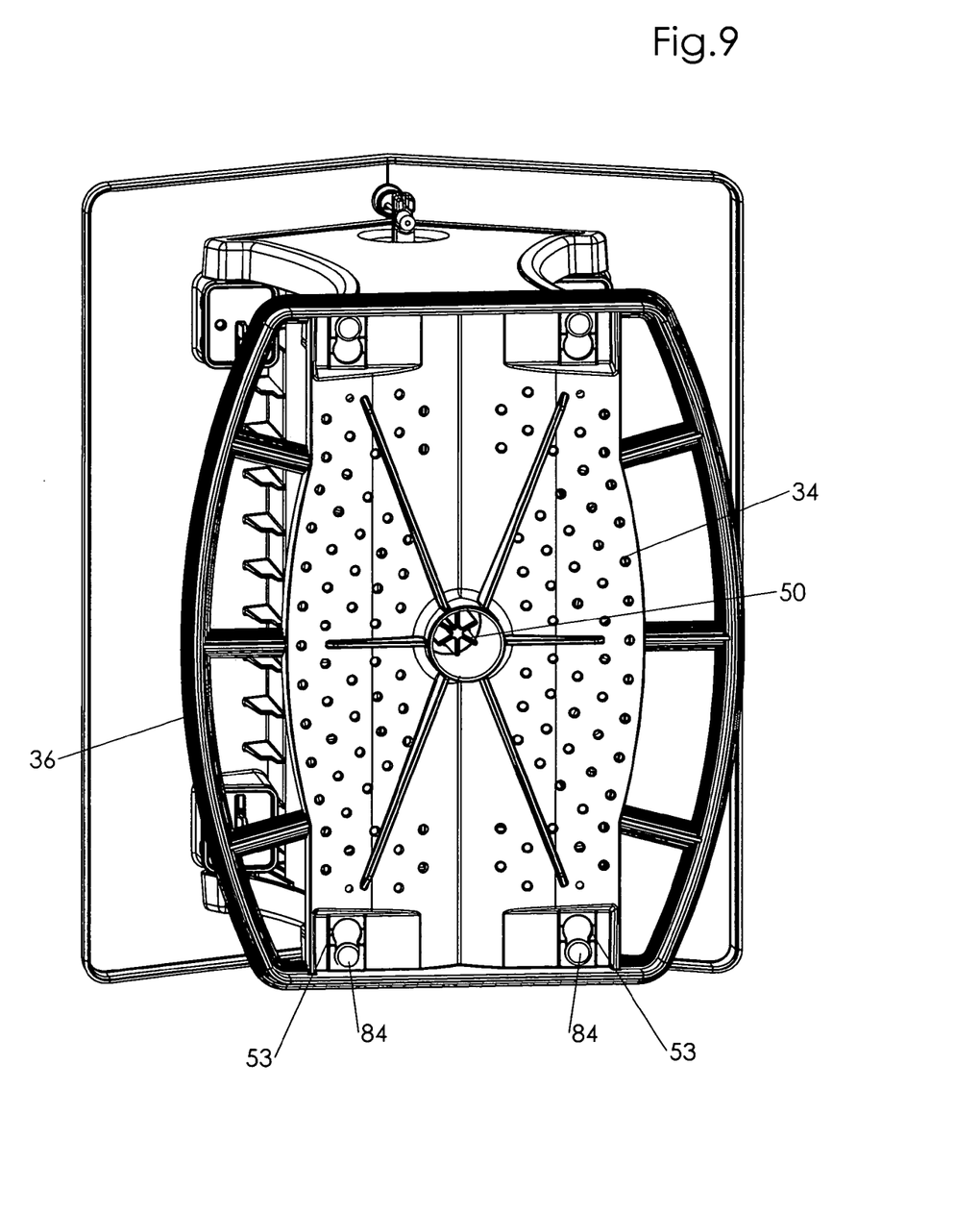
FIG. 9 is a bottom perspective view thereof.

Upper reinforcing member 20 is designed to fit between end walls 12, 14 with the end structure 98 passing through elliptical aperture 86 when upper reinforcing member 20 is in a position wherein in V-shaped triangular portion 94 is in a side position as shown in FIGS. 3, 4 and 5. After being inserted within elliptical aperture 86, the member can be rotated such that centre triangular portion 94 has an inverted V-shaped configuration. Cylindrical portion 100 locks within the central portion of elliptical aperture 86 to provide the necessary rigidity to the structure and in particular, to the upper portion of end walls 12, 14. The locking of cylindrical portion 100 may be aided by small protrusions formed on the upper wall surrounding elliptical aperture 86 such that a slight locking of the upper reinforcing member 20 is obtained.

Cover 24 includes a pair of sloping roof panels 114, 116 with apertures 118 formed at each end of the cover 24. These apertures 118 are designed to permit the passage of the hanging cord.

There are provided a pair of locking elements 120 on the underside of one of the roof panels 114, 116. Each locking element 120 comprises a housing 126, interiorly of which there is mounted a slidable shaft 122. A tab member 124 is connected to slidable shaft 122 such that it may be moved inwardly of housing 126 or outwardly thereof. When moved outwardly, shaft 122 is designed to engage one of the recesses 88 in the side wall. Preferably, shafts 122 are biased outwardly by a suitable spring member.

A hanging member or cord 128 is provided and which will engage within recess 106 and pass through slot 104.

The above described hopper type bird feeder provides several advantages. The knockdown nature of the feeder means that it can be readily disassembled without tools and cleaned and sterilized in a dishwasher. The seed guard prevents squirrels from accessing the feed. Furthermore, all parts are protected against chewing by the squirrel. The main components of the feeder can be made of materials which are known in the art. The edges of the side walls which are susceptible to chewing (as they are frequently of a softer material) are protected by the structure shown.

It will be understood that the above described embodiments are for purposes of illustration only and that changes and modifications may be made thereto without departing from the spirit and scope of the invention.

I claim:

1. A hopper type bird feeder comprising:
    a base having first and second ends and first and second sides;
    first and second end walls located proximate said first and second ends of said base;
    first and second side walls set inwardly of said first and second sides of said base to thereby define a feed access area on said base between said first and second sides and said first and second end walls, said first and second side walls having at least a portion thereof spaced upwardly from said base;
    a feed cavity defined by said base and said first and second end walls and said first and second side walls;
    a seed guard extending over said feed access area, said seed guard having at least a portion thereof spaced from said base, said seed guard having apertures formed therein;
    a structural bar extending between upper portions of said side walls, said structural bar being rotatable within openings in said side walls to move from an unlocked position to a locked position wherein said side walls are retained in a locked position; and
    said base including perches.

2. The bird feeder of claim 1 further comprising a cover extending over said seed cavity, said cover being hingedly connected to said first and second side walls.

3. The bird feeder of claim 2 wherein said cover includes locking members to lock said cover to said end walls.

4. The bird feeder of claim 1 wherein said perches include first and second perches located on respective sides of said base, said perches being integrally formed with said base.

5. The bird feeder of claim 4 wherein each of said perches has a top wall and side walls, said perch side walls being spaced inwardly of said perch top wall to provide a profiled arrangement.

6. The bird feeder of claim 1 further comprising a recess formed within a central portion of said base, said recess being designed to accept a post, said recess having a cylindrical structure located therein to accept a second size of post.

7. The bird feeder of claim 1 wherein said side walls each comprise a transparent panel.

8. The bird feeder of claim 7 wherein said side walls are mounted within slots formed on said end walls.

9. The bird feeder of claim 1 wherein said side walls are mounted such that a bottom marginal edge thereof is non accessible by a marauder.

10. The bird feeder of claim 1 further including ventilation apertures formed in said base.

11. The bird feeder of claim 1 wherein said base has a central ridge with walls sloping downwardly therefrom towards said seed access area.

12. The bird feeder of claim 1 wherein said side walls are mounted such that end marginal edges thereof are not accessible by any marauder.

13. The bird feeder of claim 1 wherein said apertures formed in said seed guard have varying sizes and are spaced from the base by varying distances.

14. The bird feeder of claim 13, wherein said perches are spaced from said feed cavity by a varying distance.

* * * * *